United States Patent Office 2,695,899
Patented Nov. 30, 1954

2,695,899

CHLORINATION OF ETHYLENE POLYMERS

Wilhelm Becker and Otto Bayer, Leverkusen-Bayerwerk, Germany, assignors to Farbenfabriken Bayer Aktiengesellschaft, Leverkusen, Germany, a corporation of Germany No Drawing. Application December 15, 1951,
Serial No. 261,931

Claims priority, application Germany December 16, 1950

5 Claims. (Cl. 260—45.5)

This invention relates to a process for the chlorination of polymers of ethylene.

It is already known to dissolve or suspend high molecular weight polymers of ethylene in inert organic solvents, for instance carbon tetrachloride or glacial acetic acid, and to treat them with chlorine. It has further been proposed to suspend high molecular weight polymers of ethylene in water and to subsequently chlorinate the resulting aqueous suspension. However, this method requires a prolonged time for reaction and results in products of a relatively low chlorine content.

This invention has as an object an improved process for the chlorination of ethylene polymers. Other objects will appear hereinafter. These objects are accomplished by chlorinating ethylene polymers as will be described more fully below.

We have surprisingly found that chlorinated polyethylenes of any desired high chlorine content and of uniform and excellent properties are obtained rapidly and in convenient manner by subjecting the aqueous emulsions as are obtained in the emulsion polymerization of ethylene or of mixtures containing ethylene and other vinyl compounds, to the action of chlorine. The process of the invention permits of producing products of a high chlorine content without difficulties. In contrast to the previously known chlorination products derived from natural rubber latex, the chlorination products of polyethylene-latex show a very good solubility in the usual solvents, which behavior could not be foreseen by those skilled in the art. Furthermore, the chlorination process in emulsions shows the advantage over the chlorination in solvents in that the reaction may be carried out with ethylene polymers of a very high molecular weight since, in contrast to solutions, aqueous emulsions of a polymer of a higher concentration than 30 percent may very easily be operated. The invention further allows to chlorinate cross-linked polymers of ethylene prepared by emulsion polymerization. On the other hand, however, the slight solubility or insolubility of these products inhibits their chlorination in organic solvents. Also the subsequent preparation of suspensions in water from weakly cross-linked polymers involves considerable difficulties owing to their difficult solubility and lacking miscibility.

The aqueous emulsions of polyethylene which may be employed in the chlorination process according to the invention, are obtained by emulsion polymerization of ethylene by distributing ethylene alone or in admixture with other polymerizable compounds in water with the aid of emulsifiers and heating to temperatures of preferably about 60–150° C. under higher pressure after adding agents accelerating the polymerization process and optionally in the presence of agents controlling polymerization. Examples of said other vinyl compounds which may be subjected to mixed polymerization with ethylene and which are of importance for the subsequent chlorination process, are vinyl chloride, dichloro ethene, fluoro ethenes, butadiene, and styrene.

The chlorination process according to the invention will proceed at a fast rate when the quantities of the emulsifiers employed in the polymerization are not too large. The emulsion is preferably diluted with water before the chlorination is started. Good agitation during the chlorination process is necessary if a reasonably high rate of absorption of chlorine is to be obtained. It has proved to be advantageous to pass the gaseous chlorine through a tower filled with the emulsion liquid. The reaction may be carried out at room temperature optionally in the presence of agents catalyzing the chlorination, for instance iron chloride, aluminum chloride, and iodine. Furthermore, the latex may be radiated during reaction with light, especially light having a high proportion of ultraviolet radiation. Moreover, solvents, for instance halogenated hydrocarbons, may be added to the emulsion liquid. The time of reaction required depends upon the temperature applied and the desired chlorine content of the product.

When a high amount of chlorine has been absorbed, the chlorination products mostly precipitate from the emulsion in form of suspensions which may be isolated, for instance by filtering. As far as the chlorination products are still present in emulsified form precipitation may be effected for instance by addition of electroyltes; separation and washing is carried out in known manner. The chlorination products obtained according to the invention are comparatively stable and may be dried by subjecting them to higher temperatures. Substances inhibiting discoloration and decomposition at higher temperatures may be added either to the latex or subsequently to the isolated products.

The new process offers the possibility of producing chlorination products of polyethylene or co-polymers thereof with a chlorine content of up to 70 percent, or even more. The properties of the products obtained according to the invention depend upon the chlorine content. Polymers containing more than 40 percent and, particularly those products of a chlorine content between 50–70 percent, represent especially valuable products which may be used for the manufacture of plastics, fibrous materials, foils, films, and varnishes. They are soluble in the usual organic solvents and the incorporation of softeners and pigments involves no difficulties. The products having a chlorine content of more than 50 percent may be used in mixture with linseed oil, wood oil, stand oil, and the common alkyd resins. The chlorination products obtained according to the invention which have a chlorine content of 60–70 percent, resemble to a large degree to the chlorination products of natural rubber. They are distinguished from the latter products by an improved elasticity and, therefore, may be blended with large amounts of hardening ingredients, such as resins, copales, and the like.

Of special technical importance are the mixed chlorination products obtained by mixing the emulsions of polyethylene with emulsions of other high molecular weight substances, and subjecting same to a simultaneous chlorination process. Emulsions of said other high molecular weight substances which are suitable for these purposes, are for instance the emulsions of polyvinyl chloride, polydichloroethene, co-polymers thereof, emulsions of polystyrene, and latices of natural rubber. The combined chlorination allows the manufacture of novel products. Thus, for instance, the combination products of chlorinated polyethylene and chlorinated natural rubber are highly suitable for making films, whereas the combination products of chlorinated polyethylene and chlorinated polyvinyl chloride when used as varnishes show an excellent elasticity and very good hardness properties. The products obtained according to the invention are distinguished by an excellent stability to chemical influences.

The invention is further illustrated by the following examples without being restricted thereto, the parts given being by weight.

*Example 1*

An emulsion of polyethylene is prepared by polymerisation of ethylene in a solution of 3 parts of the sodium salt of sulfonated, long-chain paraffin hydrocarbons, 1 part of potassium persulfate, 4 parts of hydrogen superoxide and 0.5 part of tributylamine in 100 parts of water at 90° C. under a pressure of 900 atmospheres. A finely distributed stream of chlorine is passed at 60° C. through the emulsion diluted to a solid content of 10 per cent by adding water. The chlorination process is stopped as soon as the chlorine content of the product amounts to 40 percent. After addition of a concentrated sodium chloride solution the precipitated chlorination product is filtered off. The product is subsequently washed with a dilute soda solution and dried at 60° C.

*Example 2*

An emulsion of polyethylene is prepared according to Example 1, however, while leaving out persulfate, hydrogen superoxide and tributyl amine, and employing instead azoisobutyric acid nitrile. Chlorine is passed through the emulsion for 6 hours at a temperature of 80° C. All of the chlorination product immediately precipitates in a form which may be filtered off. The product purified and dried according to the recipe of Example 1, has a chlorine content of 63.4 percent. It is very easily soluble in the usual solvents and especially suitable for producing corrosion-proof coatings.

*Example 3*

300 parts of vinyl chloride are emulsified in 1500 parts of water containing 2 parts of fat alcohol sulfonate, 5 parts of potassium persulfate and 20 parts of hydrogen superoxide in a dissolved state. Ethylene is pressed into the resulting emulsion at 80° C. under a pressure of 80 atmospheres. Said atmospheric pressure is maintained by pressing in further quantities of ethylene. After completion of the polymerization reaction the emulsion liquid is degassed and subjected to the action of chlorine. A white product containing more than 60 percent of chlorine is thus obtained.

*Example 4*

100 parts of a polyethylene emulsion obtained as described in Example 1 are mixed with 100 parts of an emulsion prepared by conventional methods by co-polymerisation of equal parts of vinyl chloride and 1.1-dichloro ethane in the presence of the sodium salts of sulfonated, long-chain paraffin hydrocarbons as emulsifier. This mixture is diluted with 400 parts of water and prechlorinated at 80° C.; after lowering the temperature to 30° C. the chlorination process is continued until the resulting product is saturated. The precipitated chlorination product is isolated and dried. The chlorine content of the product amounts to 62.3 percent. The chlorination product shows excellent properties which are equal to the product obtained according to Example 2.

*Example 5*

100 parts of the acetate of stearyl dipropylene triamine are dissolved in 950 parts of water and the resulting solution is filled into a stirring apparatus. 150 parts of benzene, 2.5 parts of the sodium salt of the sulfinic acid of long-chain paraffins and 7.5 parts of azo-iso-butyric nitrile are added thereto. The oxygen of the gaseous phase is substantially removed by treating the solution with nitrogen and the apparatus is filled with ethylene under a pressure of 300 atmospheres. The solution is heated to 70° C. and polymerisation is carried out with stirring for 24 hours, the pressure dropping thereby to about 100 atmospheres. The latex thus obtained contains 17.5 percent of polyethylene. The product is diluted to a solid content of 5 percent and chlorination is performed as described in the preceding examples. The resulting soluble, colorless chlorination product is a powder containing 66 percent of chlorine.

We claim:

1. A process for the manufacture of chlorination products of polymers which comprises polymerizing compounds selected from the group consisting of ethylene and mixtures of ethylene with vinyl compounds, in aqueous emulsion containing, as the emulsifying agent, a water-soluble salt of a compound of the group consisting of sulfonated long chain paraffin hydrocarbons, sulfinated long chain paraffin hydrocarbons and sulfonated fat alcohols and substantially immediately subjecting the emulsion of the finely dispersed polymer to the action of chlorine until the added chlorine is over about 40%.

2. The process which comprises polymerizing ethylene in an aqueous emulsion containing, as the emulsifying agent, a water soluble salt of a compound of the group consisting of sulfonated long chain paraffin hydrocarbons, sulfinated long chain paraffin hydrocarbons and fat alcohol sulfonates and substantially immediately subjecting said emulsion of the finely dispersed polymer to the action of chlorine until the added chlorine is over about 40%.

3. The process which comprises polymerizing ethylene in mixture with at least one vinyl compound selected from the group consisting of vinyl chloride, dichloro ethene, fluoro ethene, butadiene and styrene in an aqueous emulsion containing, as the emulsifying agent, a water soluble salt of a compound of the group consisting of sulfonated long chain paraffin hydrocarbons, sulfinated long chain paraffin hydrocarbons and fat alcohol sulfonates and substantially immediately subjecting said emulsion of the finely dispersed polymer to the action of chlorine until the added chlorine is over about 40%.

4. The process which comprises separately polymerizing an aqueous emulsion of ethylene and an aqueous emulsion of other polymerizable vinyl compounds, each of said emulsions containing as the emulsifying agent, a water soluble salt of a compound of the group consisting of sulfonated long chain paraffin hydrocarbons, sulfinated long chain paraffin hydrocarbons and sulfonated fat alcohols, mixing the polymerized emulsions and subjecting the mixture substantially immediately to the action of chlorine until the added chlorine is over about 40%.

5. The process which comprises separately polymerizing an aqueous emulsion of ethylene and an aqueous emulsion of at least one polymerizable vinyl compound selected from the group consisting of vinyl chloride, dichloro ethene, fluoro ethene, butadiene and styrene, each of said emulsions containing as the emulsifying agent a water soluble salt of a compound of the group consisting of sulfonated long chain paraffin hydrocarbons, sulfinated long chain paraffin hydrocarbons and sulfonated fat alcohols, mixing the polymerized emulsions and subjecting the mixture substantially immediately to the action of chlorine until the added chlorine is over about 40%.

References Cited in the file of this patent

UNITED STATES PATENTS

| Number | Name | Date |
|---|---|---|
| 2,503,252 | Ernsberger | Apr. 11, 1950 |
| 2,592,763 | Taylor | Apr. 15, 1952 |
| 2,609,365 | Scott | Sept. 2, 1952 |